United States Patent [19]

Yasuda et al.

[11] Patent Number: 4,700,241

[45] Date of Patent: Oct. 13, 1987

[54] APPARATUS FOR RECORDING AND REPRODUCING DIGITAL SIGNALS

[75] Inventors: Syuhei Yasuda, Nara; Hiroshi Ii, Higashihiroshima; Taizo Sasada, Hirakata, all of Japan

[73] Assignee: Sharp Kabushiki Kaisha, Osaka, Japan

[21] Appl. No.: 843,722

[22] Filed: Mar. 25, 1986

[30] Foreign Application Priority Data

Mar. 26, 1985 [JP] Japan .................................. 60-64574

[51] Int. Cl.⁴ ............................................... G11B 5/09
[52] U.S. Cl. ......................................... 360/51; 360/46
[58] Field of Search ......................... 360/51, 46, 41, 39, 360/26; 375/110

[56] References Cited

U.S. PATENT DOCUMENTS 4,626,933 12/1986 Bucska et al. .......................... 360/51

Primary Examiner—Vincent P. Canney

Attorney, Agent, or Firm—Birch, Stewart Kolasch & Birch

[57] ABSTRACT

An apparatus for recording and reproducing digital signals includes a detector for detecting and producing a phase data signal of a sampled point of the digital signal, a first comparator for comparing a first phase data signal at one sampling point and a second phase data signal at one previous sampling point, a second comparator for comparing a predetermined value with a phase difference between the second phase data and newly detected phase data, a condition detecting means, utilizing the results of the first and second comparators, for detecting whether two adjacent sampling points are within a reference phase period, and sampling pulse generating means for generating one sampling pulse when the two sampling points are separated by a distance equal to the reference phase period, two sampling pulses when the distance is greater than the reference phase period; and no sampling pulse when the distance is less than the reference phase period.

5 Claims, 6 Drawing Figures

APPARATUS FOR RECORDING AND REPRODUCING DIGITAL SIGNALS

BACKGROUND OF THE INVENTION

1. Field of the Invention

The present invention relates to an apparatus for recording and reproducing digital signals on a magnetic tape and, more particularly, to an improvement thereof which can properly record and reproduce digital signals even when wow and flutter are present.

2. Description of the Prior Art

A digital recording and reproducing apparatus, known as a digital tape recorder, has been proposed in various systems, one of which is disclosed in Japanese Patent Publication (unexamined) No. 92410/1984 issued May 28, 1984 (a counterpart issued as U.S. Pat. No. 4,543,531 on Sept. 24, 1985, and a counterpart EPC application was published as A1 109837 on May 30, 1984).

According to this reference, a digital audio signal is pulse code modulated (PCM) into a k bit signal to be recorded on a magnetic tape having n tracks. The signals in each track are processed serially in a digital manner making it possible to share the hardware between the tracks, and at the same time, enabling the utilization of circuits in the IC form.

According to the prior art apparatus, such as disclosed in the above identified reference, the circuit is operated by clock pulses $\phi1$, $\phi2$ and $\phi3$ each having a fixed frequency. Therefore, when a tape flutter should take place caused by a speed change of the tape, jitter and wow may take place. In such a case, the circuit can not properly record or reproduce the digital signal, resulting in a high rate of error.

SUMMARY OF THE INVENTION

The present invention has been developed with a view to substantially solving the above described disadvantages and has for its essential object to provide an improved digital signal recording and reproducing apparatus which can record and reproduce the digital signal correctly even when jitter and wow should take place.

In accomplishing these and other objects, a digital signal recording and reproducing apparatus according to the present invention comprises a detector for detecting and producing a phase data of a sampled point, a first comparator for comparing a first phase data at one sampling point and a second phase data at a previous sampling point, a second comparator for comparing a predetermined value (N/2) with a phase difference between the second phase data and newly detected phase data, a condition detector, utilizing the results of the first and second comparators, for detecting whether or not two reference phases are contained, or no reference phase is contained, between the first and second sampling points, for producing an insert signal when two reference phases are detected, and producing a delete signal when no reference phase is detected, and a sampling pulse generator for generating one sampling pulse when neither of the insert signal or delete signal is produced, two sampling pulses when the insert signal is produced, and no sampling pulse when the delete signal is produced.

According to the present invention, a correction signal generating means is further provided for generating a first correction signal when a predetermined number of the insert signal is produced, and for generating a second correction signal when a predetermined number of the delete signal is produced, and an adder inserted in the phase data circulation loop for adding the first and second correction signals to the phase data to be circulated.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENT

In the embodiment described herein, the magnetization minimum inversion span (Tmin) is selected, as an example, to be 1.5T (wherein T is a channel bit rate), and the magnetization maximum inversion span (Tmax) is selected to be 4.0T. Also, the digital signal is modified by way of an NRZ (Non-Return-to-Zero) encoding/decoding system.

Figure 1:
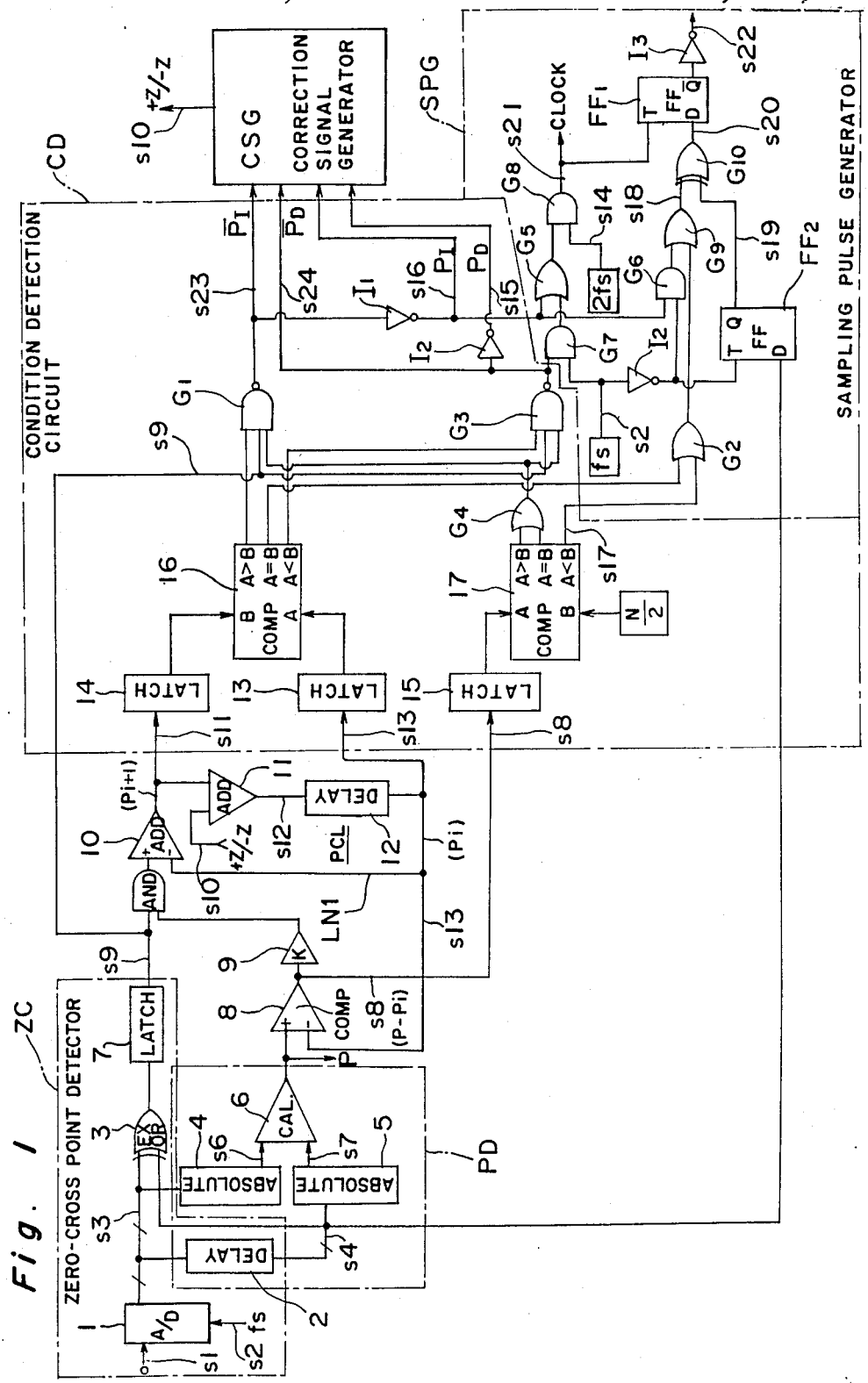
FIG. 1 is a circuit diagram of a digital signal recording and reproducing apparatus, particularly showing a detail of a clock generator which generates clock pulses and which changes its frequency with respect to the change of the tape speed.

Referring to FIG. 1, a digital signal recording and reproducing apparatus according to one preferred embodiment of the present invention is shown, which receives a data signal s1 (FIG. 6) at A/D (analog-to-digital) converter 1 and produces from inverter I3 a digital signal s22 (FIG. 6) which is sampled by clock pulses s21 (FIG. 6) produced from AND gate G8.

Figure 6:
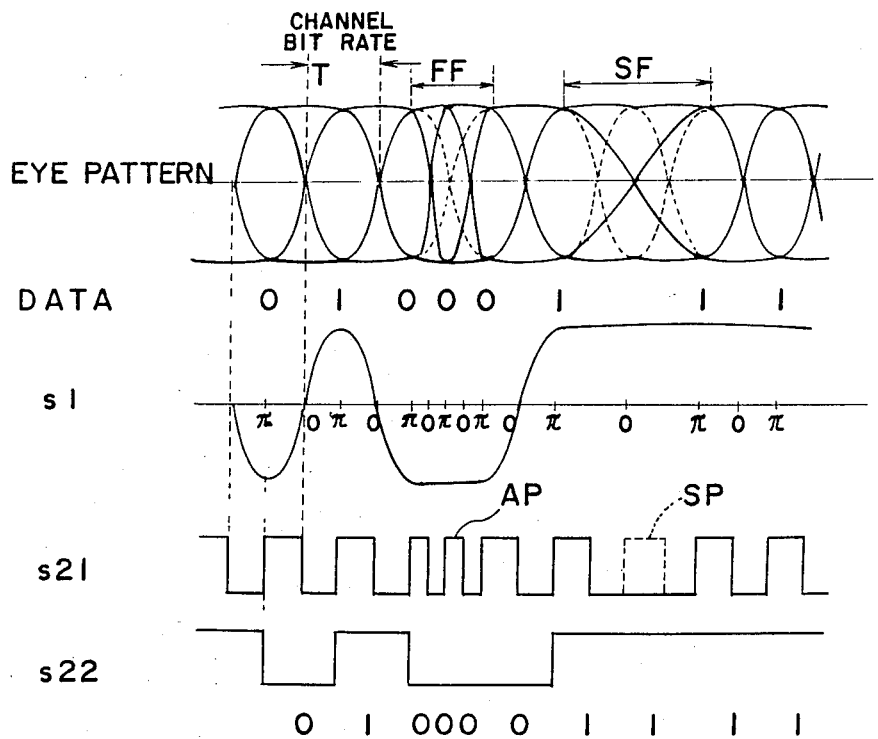
FIG. 6 shows waveforms illustrating the fundamental operation of the digital signal recording and reproducing apparatus of the present invention.

Signal s1 is a signal produced from a read/write head (not shown) as the head passes the magneticable surface of a recording medium, such as a magnetic tape. Signal s1 in FIG. 6 is shown as carrying data of (01000111). Signal s1 is based on an eye pattern (FIG. 6) defined by the combination of sine and cosine waves having zero cross points spaced by the channel bit rate T. Therefore, the obtained signal s1, which is formed by connecting the selected upper half cycles and lower half cycles of the eye pattern, has zero crossing points at phase "0". To detect the data carried in signal s1, sampling should preferably be carried out at phase "pi". However, since the sampling pulses are basically prepared independently from signal s1, the sampling pulses and the reproduced signal s1, are not necessarily synchronized. As a matter of fact, they are not synchronized most of the time. Therefore, a suitable detecting means is necessary to detect whether or not the sampled data repesents "1" or "0". Such a detecting means is disclosed in the above mentioned U.S. Pat. No. 4,543,531 or in EPC application publication No. A 1 109837.

A problem arises when the tape speed changes to thereby change the data transmission speed. For example, when the tape speed (data transmission speed) increases, the time interval between the two neighboring phase "pi's" becomes short, such as shown at period FF in FIG. 6 (exaggerated). This results in the increase of the number of phase "pi's" occurring in signal s1 in a unit time. In this case, if the sampling pulses produced remain at the same sampling frequency, one bit or several bits of data may be lost.

Also, when the tape speed (data transmission speed) slows down, the time interval between the two neighboring phases "pi's" becomes long, such as shown at period SF in FIG. 6 (exaggerated). This results in the decrease of the number of phase "pi's" occurring in signal s1 in a unit time. In this case, if the sampling pulses produced remain at the same sampling frequency, one bit or several bits of error data may be inserted.

To eliminate the above disadvantage, the present invention provides, as shown in FIG. 1, a condition detection circuit CD which can detect the change of the data transmission speed and a sampling pulse generator SPG which provides an additional sampling pulse AP (signal s21 in FIG. 6) when it is detected that the data transmission speed is increased, thereby providing an additional one bit data (actually one bit ahead data is shifted), or to skip one sampling pulse SP (signal s21 in FIG. 6) when it is detected that the data transmission speed is decreased, thereby omitting one bit data (actually the data is shifted to one bit ahead position).

Also according to the present invention, a correction signal generator CSG is provided to change the data representing the channel bit rate, as stored in delay 12, during the change of the data transmission speed so as to make the rate of error occurrence as small as possible.

Referring to FIG. 1, A/D converter 1 converts signal s1 to k-bit digital signal s3 which is described by two's complement so that the MSB (most significant bit) "1" or "0" indicates, respectively, the sign (+) or (−) of the converted k-bit digital signal s3. The output of A/D converter 1 is connected to a parallel k-bit delay circuit 2 which produces a delayed signal s4 which is a one sampling period delayed signal. The MSB of the present signal S3 and the MSB of the delayed signal s4 are both applied to an exclusive-OR gate 3, so that gate 3 produces a HIGH level signal when the applied MSBs have different sign, indicating that the data signal s1 has crossed the zero level between the present and one previous sampling points. In other times, exclusive-OR gate 3 produces a LOW level signal. The signal from exclusive-OR gate 3 is stored in a latch 7. Accordingly, the above described circuits 1, 2, 3 and 7 define a zero-cross point detector ZC.

The present signal s3 and the delayed signal s4 are also applied, respectively, to absolute circuits 4 and 5 at which absolute values $|S_{i+1}|$ and $|S_i|$ of the sampled signals are obtained, respectively, wherein $S_{i+1}$ and $S_i$ represent amplitudes of signal s1 at two subsequent sampling points. Then, at calculator 6, the phase different P between the zero-crossing point and the sampling point $S_{i+1}$ is calculated by the following equation;

$$P = |S_{i+1}| \times N/(|S_{i+1}| + |S_i|)$$

in which N represents the number of equally divided sections between adjacent two sampling points. Although this calculation is carried out after every sampling, the calculated phase difference P will be used in a phase data circulation loop PCL (described later) only when the zero crossing point is detected between the sampling points $S_{i+1}$ and $S_i$. Such a phase difference P is referred to as a reference phase P. The above described circuits 2, 4, 5 and 6 define a reference phase detector PD.

The obtained reference phase P is applied to comparator 8 at which the reference phase P is compared with an output signal s13 of the phase data circulation loop PCL fundamentally defined by an adder 10 and a parallel m-bit delay circuit 12. A signal s8 produced from comparator 8, representing the difference P-$P_i$, is applied to a multiplier 9 at which the difference P-$P_i$ is multiplied by a predetermined constant K (0<K<1). The constant K corresponds to the loop gain, so that the difference P-$P_i$ is compensated in multiplier 9. When no zero-crossing point is detected, the phase data circulates in the phase data circulation loop PCL through adder 10, delay 12 and line LN1. However, when the zero-crossing point is detected, an AND gate connected to latch 7 is enabled to permit the transmission of the compensated difference P-$P_i$ to adder 10. Thus the circulation data is added with the compensated difference P-$P_i$ at adder 10.

The structure so far described is fundamentally the same as that disclosed in the above mentioned U.S. Pat. No. 4,543,531 or in EPC application publication No. A1 109837.

According to the present invention, another adder 11 is connected between adder 10 and delay circuit 12 so as to compensate the phase data circulated in the phase data circulation loop PCL by adding a correction signal s10, representing a value +z, zero or −z, to the phase data, thereby correcting phase deviations caused by wow, flutter or the like.

When the wow or flutter is very small, signal s10 representing zero is produced. In this case, the phase data that circulates through adders 10 and 11, delay circuit 12 and line LN1, will be maintained constant. Also, in this case, the sampling pulse will be produced at the same frequency.

When the wow or flutter is greater than a predetermined level caused by slow tape running, signal s10 representing +z is produced. In this case, the phase data that circulates through adders 10 and 11, delay circuit 12 and line LN1 will be increased by z after each circulation. Also, in this case, one sampling pulse SP is skipped (signal s21 in FIG. 6).

When the wow or flutter is greater than a predetermined level caused by fast tape running, signal s10 representing −z is produced. In this case, the phase data that circulates through adders 10 and 11, delay circuit 12 and line LN1 will be decreased by z after each circulation. Also, in this case, an additional sampling pulse AP will be added (signal s21 in FIG. 6). Adding of subtracting the value z is substantially the same as changing the value N.

The correction signal s10 is generated in the correction signal generator CSG which will be described later in connection with FIG. 4.

According to the present invention, a result of the comparison between a phase $P_i$ at the sampling point of data $S_i$ measured from the phase "0" point and a phase $P_{1+i}$ at the sampling point of data $S_{i+2}$ measured from the phase "0" point, and a result of the comparison between the output signal s8 representing the difference (P-$P_i$) and a value N/2, are used to determine the condition of data signal s1 from among different conditions which are depicted in FIGS. 2a to 2d.

Figure 2A:
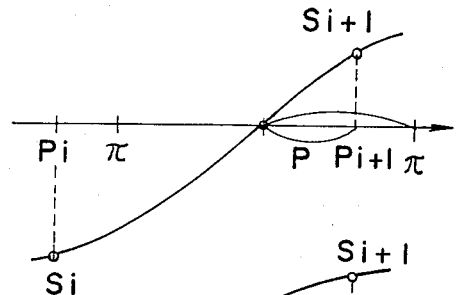
FIGS. 2a to 2d are graphs showing different conditions of the data signal due to the change of the phase of the sampling points and also to the change of the tape speed.

As shown in FIG. 2a, when a zero-crossing point exists between two sampling points at phases $P_i$ and $P_{i+1}$, with the zero crossing point located closer to phase $P_{i+1}$, the following relationships are satisfied:

$$P_i \geq P_{i+1} \text{ and } |P_i\text{-}P| < N/2.$$

Figure 2B:
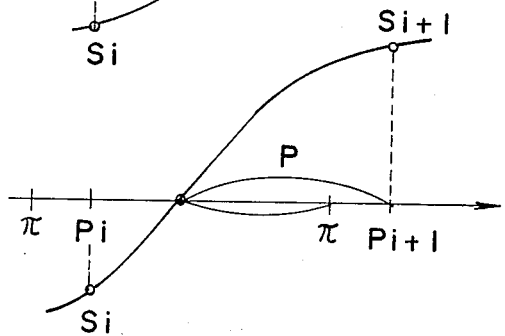

As shown in FIG. 2b, when a zero-crossing point exists between two sampling points at phases $P_i$ and $P_{i+1}$, with the zero crossing point located closer to phase $P_i$, the following relationships are satisfied:

$$P_i < P_{i+1} \text{ and } |P\text{-}P_i| < N/2.$$

Figure 2C:
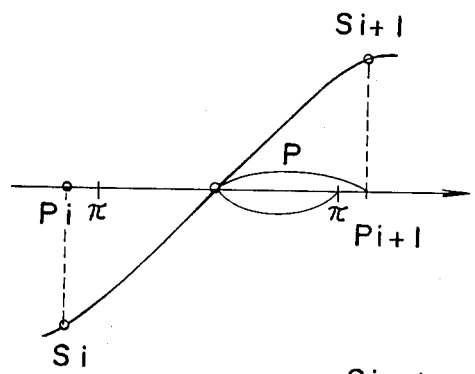

As shown in FIG. 2c, when a zero-crossing point exists between two sampling points at phases $P_i$ and $P_{i+1}$, with two phase "pi's" located therebetween, the following relationships are satisfied:

$$P_i > P_{i+1} \text{ and } (P_i\text{-}P) \geq N/2.$$

Figure 2D:
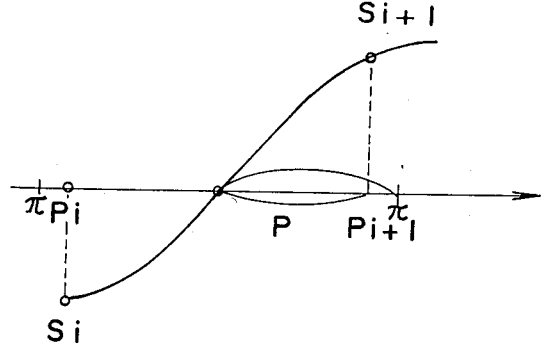

As shown in FIG. 2d, when a zero-crossing point exists between two sampling points at phases $P_i$ and $P_{i+1}$, with no phase "pi" located therebetween, the following relationships are satisfied:

$$P_i < P_{i+1} \text{ and } (P\text{-}P_i) \geq N/2.$$

In the embodiment described herein, the detection of one condition from the above described four different conditions is done by the condition detection circuit CD. Based on the detected result, sampling pulses are generated using clock pulses having a normal sampling frequency fs and clock pulses having a frequency 2fs.

More specifically, when the condition depicted in FIG. 2c is detected, the condition detection circuit CD produces a HIGH level insert signal $P_I$ which is applied to sampling pulse generator SPG to generate one additional sampling pulse AP. Thus, in the condition depicted in FIG. 2c, two sampling pulses are generated between sampling points at phases $P_i$ and $P_{i+1}$.

To the contrary, when the condition depicted in FIG. 2d is detected, the condition detection circuit CD produces a HIGH level delete signal $P_D$ which is applied to sampling pulse generator SPG to skip one sampling pulse SP. Thus, in the condition depicted in FIG. 2d, no sampling pulse is generated between sampling points at phases $P_i$ and $P_{i+1}$.

Figure 4:
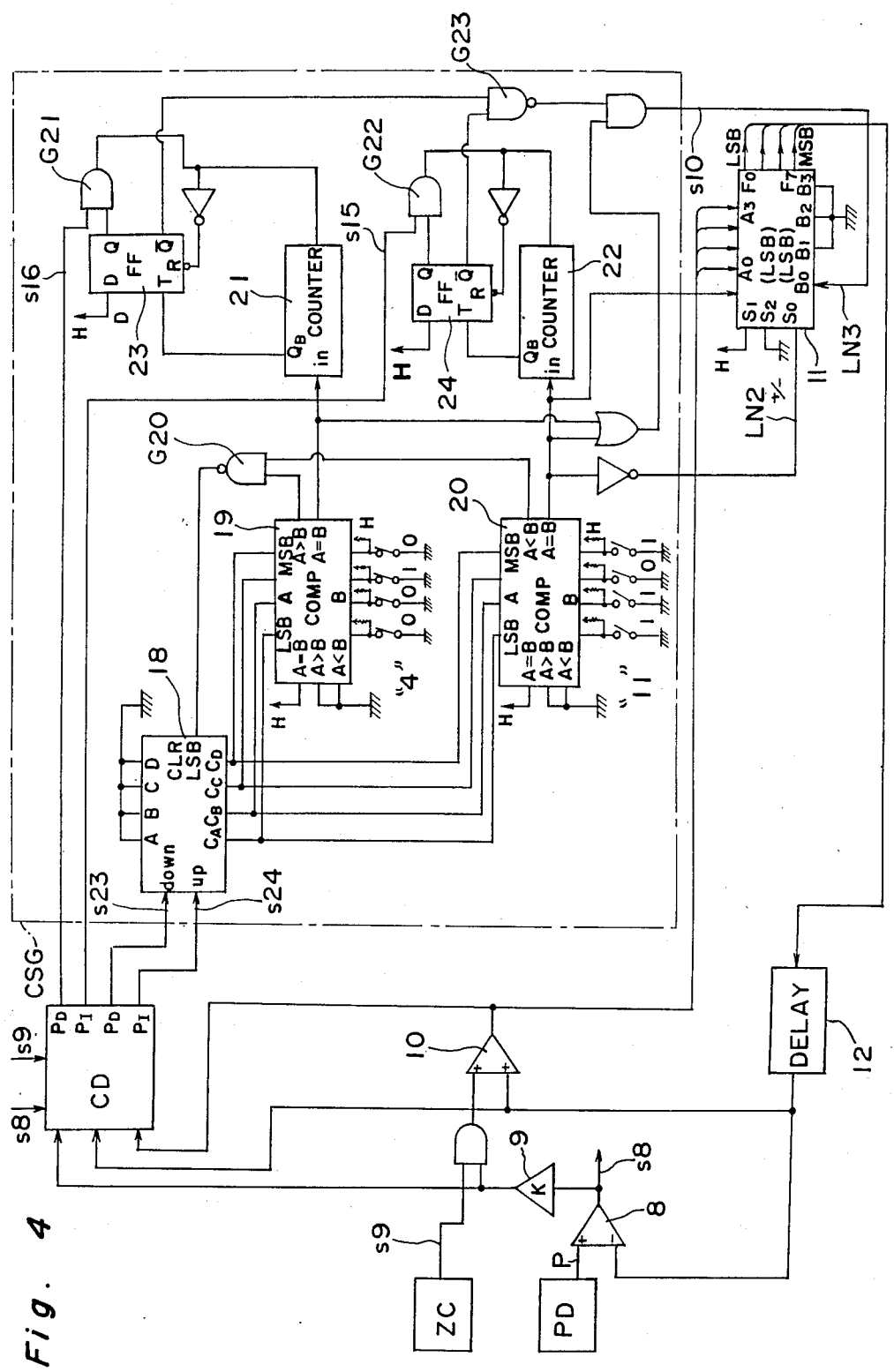
FIG. 4 is a circuit diagram of the same circuit as that shown in FIG. 1, but particularly showing a detail of a correction signal generator.

Also, according to the embodiment described herein, in the correction signal generator CSG, a LOW level insert signal $\overline{P_I}$ and a LOW level delete signal $\overline{P_D}$ are used, respectively, to count up and count down a counter 18 as shown in FIG. 4. When counter 18 exceeds a predetermined high amount, the correction signal generator CSG generates a correction signal −z, and when it has counted below a predetermined low amount, the correction signal generator CSG generates a correction signal z. In this manner, the interval N between the two sampling points can be changed, thereby counterbalancing the speed change, such as in the wow and flutter.

Figure 3:
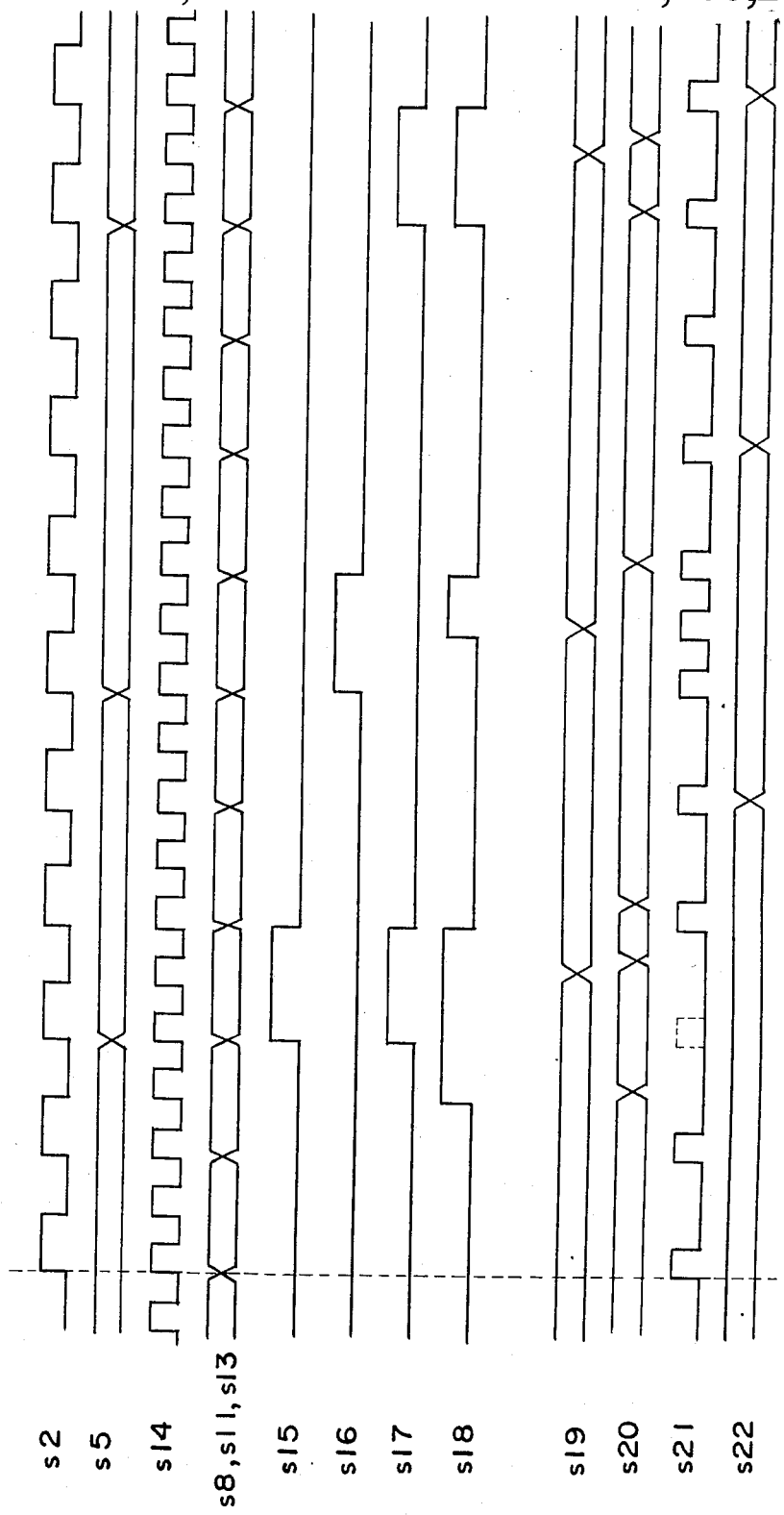
FIG. 3 shows waveforms obtained at various points in the circuit of FIG. 1.

The sampling pulse generator SPG (FIG. 1) includes two clock pulse generators for generating clock pulses s2 and s14, respectively, at frequencies fs and 2fs, the waveforms of which are shown in FIG. 3.

The following Tables 1-4 show the detection of the sampled data, in which the data is represented by the NRZ encoding/decoding system. In the Tables, "H" indicates that the sampled data is positive, and "L" indicates that the sampled data is negative. Also, "0" and "1" indicate the signs, positive and negative, respectively, of the sampled signal $S_i$ (signal s4) or signal $S_{i+1}$ (signal s3). Also, "X" indicates that the sign can be either positive or negative.

TABLE 1

| Detected result: $P_i \geq P_{i+1}$ and $(P_i - P) < N/2$ | | |
|---|---|---|
| Sign of signal $S_i$ | Sign of signal $S_{i+1}$ | Data |
| 0 (Positive) | 1 (Negative) | H |
| 1 (Negative) | 0 (Positive) | L |

TABLE 2

| Detected result: $P_i < P_{i+1}$ and $(P - P_i) < N/2$ | | |
|---|---|---|
| Sign of signal $S_i$ | Sign of signal $S_{i+1}$ | Data |
| 1 (Negative) | 0 (Positive) | H |
| 0 (Positive) | 1 (Negative) | L |

TABLE 3

| Detected result: $P_i > P_{i+1}$ and $(P_i - P) \geq N/2$ | | |
|---|---|---|
| Sign of signal $S_i$ | Sign of signal $S_{i+1}$ | Data |
| 0 (Positive) | 1 (Negative) | H L |
| 1 (Negative) | 0 (Positive) | L H |

TABLE 4

| Detected result: $P_i < P_{i+1}$ and $(P - P_i) \geq N/2$ | | |
|---|---|---|
| Sign of signal $S_i$ | Sign of signal $S_{i+1}$ | Data |
| X | X | L |

Still referring to FIG. 1, latches 13, 14 and 15 are provided to store data in response to the pulse having a frequency fs. Latch 13 stores output signal s13, representing the signal $P_i$, from the parallel m-bit delay circuit 12. Latch 14 stores output signal s11, representing the signal $P_{i+1}$, from adder 10, and latch 15 stores output signal s8, representing the signal P-$P_i$, from comparator 8.

The outputs of latches 13 and 14 are connected to terminals A and B, respectively, of a comparator 16, thereby comparing the data stored in latches 13 and 14, i.e., comparing the signals $P_i$ and $P_{i+1}$. The result of the comparison is either A>B ($P_i$>$P_{i+1}$), A=B ($P_i$=$P_{i+1}$) or A<B ($P_i$<$P_{i+1}$). When the result is A>B, an output is applied to a NAND gate G1; when the result is A=B, an output is applied to an OR gate G2; and when the result is A<B an output is applied to NAND gate G3.

The output of latch 15 is applied to terminal A of another comparator 17. The other terminal B of comparator 17 is connected to a constant amount generator which generates a constant amount data representing N/2. Thus, comparator 17 compares the signal (P-$P_i$) and data N/2. The result of the comparison is either A>B (P-$P_i$>N/2), A=B (P-$P_i$=N/2) or A<B (P-$P_i$<N/2). When the result is A>B or A=B, an output is applied to an OR gate G4; and when the result is A<B, an output signal s17 is applied to an OR gate G2.

NAND gate G1 also receives signal s9 and an output of OR gate G4. NAND gate G1 produces a LOW level insert signal $\overline{P_I}$ which is applied to inverter I1 which in turn produces a HIGH level insert signal $P_I$ (signal s16). Signals $\overline{P_I}$ and $P_I$ are applied to correction signal generator CSG. Signal $P_I$ is also applied to OR gate G5 and AND gate G6. NAND gate G3 receives signal s9 and an output of OR gate G4. NAND gate G3 produces a HIGH level delete signal $\overline{P_D}$ (signal s24) which is applied to inverter I2 which in turn produces a LOW level delete signal $P_D$. Signals $\overline{P_D}$ and $P_D$ are applied to correction signal generator CSG. AND gate G7 receives the output from NAND gate G3 and also clock pulse signal s2 having a frequency fs. The output of AND gate G7 is applied to OR gate G5. An output of OR gate G5 and a clock pulse signal s14 having a frequency $2\overline{fs}$ are applied to AND gate G8. The output of AND gate G8 produces the sampling pulses which are applied to terminal T of flip-flop FF1. Also, the signal s2 (clock pulse with frequency fs) is applied through inverter I2 to AND gate G6 and also to terminal T of flip-flop FF2. The terminal D of flip-flop FF2 is applied with signal s4. Also, OR gate G9 receives the outputs of AND gate G6 and OR gate G2. One input of an EXCLUSIVE OR gate G10 receives the output of OR gate G9, i.e., signal s18, while the other input thereof receives a signal s19 from Q terminal of flip-flop FF2. An output of EXCLUSIVE OR gate G10 is applied to terminal D of flip-flop FF1. A signal produced from $\overline{Q}$ terminal of flip-flop FF1 is applied to inverter I3 which produces the digital signal s22 (FIG. 6).

In operation, when the condition shown in FIG. 2d takes place, comparator 16 detects the A<B and, at the same time, comparator 17 detects that A≧B. Accordingly, signal s15, representing the delete signal $P_D$, carries "1", and signal s16, representing the insert signal $P_I$, carries "0". Thus, OR gate G5 produces a LOW level signal to disable AND gate G8. Thus, both clock pulse s2 (frequency fs) and clock pulse s14 (frequency 2fs) will not be produced, resulting in the pulse skip. This result is also shown in Table 4 in which it is indicated that data carriers "L" for preventing the generation of both clock pulses s2 and s14.

Next, when the condition shown in FIG. 2c takes place, comparator 16 detects that A>B and, at the same time, comparator 17 detects that A≧B. Accordingly, signal s15, repesenting the delete signal $P_D$, carries "0", and signal s16, representing the insert signal $P_I$, carries "1". Thus, OR gate G5 continues to produce a HIGH level signal, thereby enabling AND gate G8 to permit the generation of two clock pulses s14 (frequency 2fs), resulting in the additional sampling pulse. This result is also shown in Table 3 in which it is indicated that data carries "H L" or "L H" depending on the sign of signals $S_i$ and $S_{i+1}$.

Next, when the conditions shown in FIG. 2a or 2b takes place, comparator 16 detects that A≧B and, at the same time, comparator 17 detects that A<B, or comparator 16 detects that A<B and, at the same time, comparator 17 detects that A<B. In this case, signal s15, representing the signal $P_D$, carries "0", and signal s16, representing the signal $P_I$, carries "0". Thus, AND gate G8 is enabled by the clock pulse s2 to permit the generation of one clock pulse s14 (frequency 2fs). This result is also shown in Table 3 in which it is indicated that data carries "H" or "L" depending on the sign of signals $S_i$ and $S_{i+1}$.

The data shown in Tables 1-4 are produced by the gate circuit shown in FIG. 1. Particularly, the detection of the sign of signals $S_i$ and $S_{i+1}$ is done when there is a zero-crossing point between the sampling points. In this case, a relationship (sign of signal $S_i$)×(sign of signal $S_{i+1}$)<0 is satisfied. While the phase data is circulating in the phase data circulation loop PCL, one clock pulse s14 (frequency 2fs) is produced. In this case, the data may be detected to be either "H" or "L" merely by the sign of signals $S_i$ and $S_{i+1}$.

Flip-flop FF2 receives the delayed signal s4, and the EXCLUSIVE OR gate G10 determines the "H" and "L" of the data. A signal s17, as produced when comparator 17 detects that P<N/2, and signal s16 representing the insert signal $P_I$ are ORed at OR gate G9, and the result is applied to the EXCLUSIVE OR gate G10. Then, by the HIGH and LOW level signals of the signal s19, which is a half bit delayed signal of an $S_i$ sign signal s4, the ORed signal at OR gate G9 is changed to a HIGH level signal or a LOW level signal. A signal s20 is synchronized by the sampling clock signal s21 and is produced as a data signal s22.

FIG. 3 shows a timing chart of various signals appearing in the circuit of FIG. 1.

Referring to FIG. 4, a detail of the correction signal generator CSG is shown. Signals $\overline{P_D}$ and $\overline{P_I}$ from condition detection circuit CD are applied to down-count and up-count terminals of a 4-bit up-down counter 18. Counter 18 counts up each time the signal $P_I$ is produced, that is each time when an additional sampling pulse AP is added. Counter 18 counts down each time the signal $P_D$ is produced, that is each time the sampling pulse is skipped. The counted result, as produced from terminals $C_A$, $C_B$, $C_C$ and $C_D$, is applied to both comparators 19 and 20. Comparator 19 compares the counted result with a predetermined low boundary, such as "4", and comparator 20 compares the counted result with a predetermined high boundary, such as "11".

When the signal $P_D$ is repeated a number of times, counter 18 counts down 0, 15, 14, 13, 12, and when it reaches 11, comparator 20 produces a HIGH pulse signal to counter 22, which then counts up to one. Then, if the signal $P_D$ is still producing, counter 18 counts down to 10, whereby comparator 20 produces a signal to a NAND gate G20 to reset counter 18. A further $P_D$ causes the count down of counter 18 in the same manner. When counter 18 has counted down to 11 for the second time, counter 22 counts up to two, thereby producing a signal to flip-flop 24. Thus, the $\overline{Q}$ terminal of flip-flop 24 produces a LOW level signal causing NAND gate G23 to produce a HIGH level signal, which is applied through an AND gate to terminal B₀ of adder 11. Adder 11 is previously stored with the correction data z. In this case, since comparator 20 is producing a HIGH pulse, line LN2 carries a LOW level signal, indicating that the correction data z should have a sign (−). Thus, in response to the HIGH level signal applied to terminal B₀, adder 11 adds a correction data −z to the circulation phase data which is transmitted from adder 10 through adder 11 to delay 12.

On the contrary, when the signal $P_I$ is repeated for a number of times, counter 18 counts up 0, 1, 2, 3 and when it reaches 4, comparator 19 produces a HIGH pulse signal to counter 21, which then counts up to one. Then, if the signal $P_I$ is still producing, counter 18 counts up to 5, whereby comparator 19 produces a signal to a NAND gate G20 to reset counter 18. A further signal $P_I$ causes the count up of counter 18 in the same manner. When counter 18 has counted up to 4 for the second time, counter 21 counts up to two, thereby producing a signal to flip-flop 23. Thus, the $\overline{Q}$ terminal of flip-flop 23 produces a LOW level signal causing NAND gate G23 to produce a HIGH level signal, which is applied through an AND gate to terminal $B_0$ of adder 11 along line LN3. In this case, since comparator 20 is producing a LOW level signal, line LN2 connected to terminal $S_0$ carries a HIGH level signal, indicating that the correction data z should have a sign (+). Thus, in response to the HIGH level signal applied to terminal $B_0$, adder 11 adds a correction data +z to the circulation phase data.

When the signal $P_I$ is repeated for a number of times to store one in counter 21, and if signal $P_D$ is produced before counter 21 counts up to two, the signal $P_D$ applied to AND gate G21 is transmitted to flip-flop 23 and counter 21, to reset the same. Thus, in order to produce a LOW level signal from $\overline{Q}$ terminal of flip-flop 23, the signal $P_I$ must be produced with no insertion of signal $P_D$. The same applies to flip-flop 24.

The above described correction is equivalent to the correction of interval N between sampling points effected without correcting the phase data.

In the above described embodiment, the signal detection and correction of only one track is described. For detecting and correcting signals from a plurality of tracks (n tracks), the following arrangement may be employed as one example. Delay 2 (FIG. 1) should be replaced with a shift register of parallel k-bit series n-bit type, or with a RAM having k×m bit capacity. Also, delay 12 should be replaced with a parallel m-bit series n-bit shift register or with a RAM having k×m bit capacity and, at the same time, signal s2 representing the clock pulse having a frequency n times greater should be used. Furthermore, correction signal generator CSG should be replaced with a circuit such as shown in FIG. 5.

Figure 5:
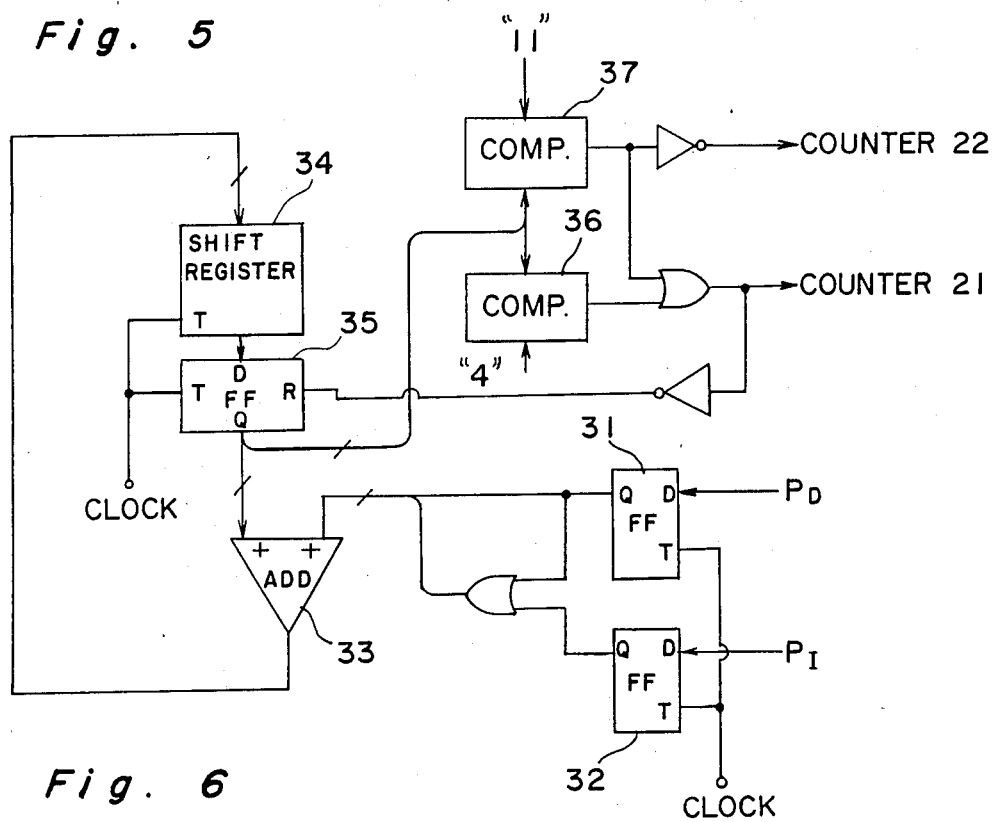
FIG. 5 is a circuit diagram showing a detail of a correction signal generator for correcting signals from n tracks.

Referring to FIG. 5, signals $P_D$ and $P_I$ are applied through flip-flops 31 and 32, respectively, to an adder 33. When one signal $P_D$ is applied, adder 33 recognizes the received signal $P_D$ as "+1". When one signal $P_I$ is applied, adder 33 recognizes the received signal $P_I$ as "−1". The counted result in adder 33 is applied to a shift register 34 which can store data of (n−1) tracks. The output of shift register 34 is connected to a flip-flop 35, thereby effecting the data reset of each track under a certain condition. Signals, representing the counted results of (n−1) tracks, are produced from shift register 34 and are applied through a flip-flop 35 to each of comparators 37 and 36 at which the counted result is compared with a high boundary, such as "11", and a low boundary, such as "4", respectively. Thus, comparators 36 and 37 correspond to comparators 19 and 20 described above in connection with FIG. 4.

The outputs of comparators 36 and 37 are connected to counters 21 and 22 for further processes in the same manner described above in connection with FIG. 5. Thus, the signals from (n−1) tracks are sequentially corrected.

In the above described embodiment, instead of using the Tmin=1.5T system, any other system can be used. For example, NRZI type Tmin=0.8T system may be used. Also, instead of using the phase data, the value N representing the number of equally divided sections between two adjacent two sampling points, may be corrected.

As apparent from the foregoing description, according to the present invention, the condition detection circuit CD can detect wow and flutter by detecting various conditions of the reproduced signal. Thus, based on the detected wow and flutter data, the sampling pulse generator SPG may generate corrected sampling pulses in which an additional pulse may be added or a pulse may be skipped so as to change the sampling rate in accordance with the wow and flutter. Thus, the sampled signal obtained from the sampling pulse generator is substantially free from the effect of the wow flutter.

Furthermore, according to the present invention, correction signal generator CSG is provided, which produces a correction signal based on the wow and flutter data from condition detection circuit CD so as to change the phase data that circulates in the phase data circulation loop PCL. Thus, the wow and flutter can be controlled with a further preciseness.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. An apparatus for recording and reproducing a digital signal comprising;
    detecting means for detecting and producing a phase data signal of a sampled point of said digital signal;
    first storing means for storing a first phase data signal at a first sampling point;
    second storing means for storing a second phase data signal at a second sampling point which is immediately before said first sampling point;
    third storing means for storing a phase difference between said second phase data with newly detected phase data;
    first comparator means for comparing said first phase data signal and said second phase data signal;
    second comparator means for comparing said phase difference with a predetermined value;
    condition detecting means, responsive to said first and second comparators, for detecting the presence of two reference phases, or the absence of any reference phase, between said first and second sampling points, and for producing an insert signal when two reference phases are detected, and producing a delete signal when no reference phase is detected; and
    sampling pulse generating means for generating one sampling pulse when neither of said insert signal or said delete signal is produced, two sampling pulses when said insert signal is produced, and no sampling pulse when said delete signal is produced.

2. An apparatus as claimed in claim 1, further comprising a sampled data producing means for producing a sampled data signal of said digital signal based on said sampling pulses from said sampling pulse generating means.

3. An apparatus as claimed in claim 1, further comprising a phase data circulation loop for circulating said phase data signal with a delay of one sampling cycle.

4. An apparatus as claimed in claim 3, further comprising: a correction signal generating means for generating a first correction signal when a predetermined number of said insert signals is produced, and for generating a second correction signal when a predetermined number of said delete signals is produced; and an adder inserted in said phase data circulation loop for adding said first and second correction signals to said phase data signal to be circulated.

5. An apparatus as claimed in claim 1, wherein said data sampling is carried out for a plurality of parallel data.

* * * * *